United States Patent

Ohira et al.

[11] Patent Number: 5,985,370
[45] Date of Patent: Nov. 16, 1999

[54] SURFACE TREATMENT OF GOLF BALLS

[75] Inventors: Takashi Ohira; Susumu Muta, both of Chichibu, Japan

[73] Assignee: Bridgestone Sports Co., Ltd., Tokyo, Japan

[21] Appl. No.: 08/984,645

[22] Filed: Dec. 3, 1997

[30] Foreign Application Priority Data

Dec. 4, 1996 [JP] Japan ................... 8-339050

[51] Int. Cl.$^6$ .............. B05D 5/04; B05D 1/36; B05D 7/02
[52] U.S. Cl. ............ 427/387; 427/322; 427/386; 427/393.5; 427/412.1; 427/430.1
[58] Field of Search .................. 427/387, 386, 427/393.5, 407.1, 322, 412.1, 430.1

[56] References Cited

U.S. PATENT DOCUMENTS

| | | | |
|---|---|---|---|
| 3,647,221 | 3/1972 | Holley | 427/412.1 |
| 3,992,014 | 11/1976 | Retford | 273/218 |
| 4,076,255 | 2/1978 | Moore et al. | 273/226 |
| 4,183,874 | 1/1980 | Fan et al. | 525/100 |
| 4,370,212 | 1/1983 | Mahr et al. | 427/500 |
| 4,374,158 | 2/1983 | Taniguchi et al. | 427/162 |
| 4,389,432 | 6/1983 | Inoue et al. | 427/299 |
| 4,797,448 | 1/1989 | Liang | 525/106 |
| 5,075,133 | 12/1991 | Hosono et al. | 427/162 |
| 5,116,644 | 5/1992 | Asai et al. | 427/164 |
| 5,300,325 | 4/1994 | Nealon | 427/393.5 |
| 5,316,739 | 5/1994 | Yoshikawa et al. | 422/186.05 |
| 5,412,024 | 5/1995 | Okada et al. | 524/577 |
| 5,459,220 | 10/1995 | Kennedy | 427/412.1 |
| 5,466,424 | 11/1995 | Kusano et al. | 427/322 |
| 5,468,317 | 11/1995 | Hsieh | 156/329 |
| 5,770,301 | 6/1998 | Murai et al. | 428/213 |
| 5,779,561 | 7/1998 | Sullivan et al. | 473/373 |
| 5,827,134 | 10/1998 | Sullivan et al. | 427/553 |
| 5,863,666 | 1/1999 | Merchant et al. | 428/544 |

OTHER PUBLICATIONS

Kato et al., Abstract 08–322967 of Japanese Patent Application 07–161466, Dec. 1996.

*Primary Examiner*—Diana Dudash
*Attorney, Agent, or Firm*—Sughrue, Mion, Zinn Macpeak & Seas, PLLC

[57] ABSTRACT

Prior to paint coating, a golf ball is surface treated with a surface treating agent comprising a silane coupling agent of the formula: $(RO)_a$—Si—$(X)_b$, wherein R is alkyl, X is a monovalent hydrocarbon group, letters a and b are integers of 1 to 3, satisfying a+b=4 and optionally an epoxy compound. The surface treatment helps the ball surface bear a paint coating of quality. The surface treating agent may be a mixture of the salane coupling agents.

7 Claims, No Drawings

SURFACE TREATMENT OF GOLF BALLS

BACKGROUND OF THE INVENTION

1. Field of the Invention

This invention relates to a method for surface treating golf balls.

2. Prior Art

In general, golf balls are delivered to the market after the golf ball surface (which designates the cover surface of a golf ball consisting of a core and a cover and the ball surface of a one-piece solid golf ball) is surface painted for the purposes of protecting the ball surface and imparting an appropriate color and luster to give an aesthetic appearance and an increased commodity value.

Because of the uniqueness of golf balls that the paint coating surface of the ball receives extremely strong impact and friction forces when hit with a club, it is desired that the paint coating be designed to have flexibility and sufficient elongation and to ensure firm adhesion to the ball surface. Various means were investigated for improving the adhesion between the paint coating and the ball surface. Prior art attempts include buffing, shot blasting and honing of the golf ball surface.

These attempts are successful in improving the adhesion between the paint coating and the ball surface, but to a less extent. Since they are physical treatments, the results of treatment largely vary among balls.

In further attempts, such physical treatments are followed by flame, corona discharge, plasma, and aqueous chlorine treatments. These procedures could not achieve a satisfactory level of adhesion and rather complicate the manufacture process. In particular, the discharge treatment requires an expensive installation, resulting in an increased cost of treatment.

SUMMARY OF THE INVENTION

Therefore, an object of the present invention is to provide a method for surface treating a golf ball in a simple, but effective manner to tailor the ball surface into a state capable of joining a coating at a high bonding force, thus ensuring the manufacture of a golf ball having a paint coating which is improved in all of aesthetic appearance, impact durability, friction resistance, water resistance, and ink receptivity.

We have found that by using a surface treating agent predominantly comprising a specific silane coupling agent, the ball surface is modified and improved so that the adhesion between the ball surface and a coating to be applied thereto is outstandingly improved. Then a golf ball having a paint coating with excellent properties can be obtained.

More specifically, the invention provides a method for surface treating a golf ball prior to paint coating with a surface treating agent predominantly comprising a silane coupling agent. The silane coupling agent is of the following general formula (1):

$$(RO)_a\text{---}Si\text{---}(X)_b \quad (1)$$

wherein R is an alkyl group, X is a substituted or unsubstituted monovalent hydrocarbon group, letters a and b are integers of 1 to 3, a+b=4, and the groups represented by X may be identical or different when b is at least 2. The group RO in the silane coupling agent is hydrolyzed with moisture to generate a silanol group which exhibits strong interaction with a resin component on the ball surface (typically cover surface). On the other hand, the group X in the silane coupling agent has high affinity to a resin component of a paint coating to be coated to the ball surface. These effects, when combined, contribute to a drastic improvement in the adhesion between the ball surface and the paint coating. Although the golf ball is a unique spherical body in that whenever the ball is hit with a club, the ball coating surface repeatedly receives strong impact forces as well as strong friction forces due to the presence of a multiplicity of dimples in the surface, the improved adhesion ensures the formation of an optimum surface paint coating on the golf ball.

The surface treating method of the invention requires no special equipment, is capable of surface treating a golf ball in a simple, but effective manner, and ensures the manufacture of a golf ball having a paint coating which is improved in all of adhesion, aesthetic appearance, durable impact resistance, friction resistance, water resistance, and ink receptivity.

DETAILED DESCRIPTION OF THE INVENTION

According to the present invention, the surface of a golf ball is treated with a surface treating agent predominantly comprising a silane coupling agent. The golf ball surface is the cover surface when the golf ball consists of a core and a cover and the ball surface when the ball is a one-piece solid golf ball.

The silane coupling agent is of the following general formula (1):

$$(RO)_a\text{---}Si\text{---}(X)_b \quad (1)$$

wherein R is an alkyl group, X is a substituted or unsubstituted monovalent hydrocarbon group, letters a and b are integers of 1 to 3, satisfying a+b=4.

More particularly, R is an alkyl group, preferably having 1 to 8 carbon atoms, especially 1 to 6 carbon atoms, for example, methyl, ethyl, propyl, butyl, pentyl and hexyl. The group RO is hydrolyzed with moisture to generate a silanol group which exhibits strong interaction with a resin component on the ball surface.

X is a substituted or unsubstituted monovalent hydrocarbon group. Examples of the unsubstituted monovalent hydrocarbon group include those having 1 to 8 carbon atoms such as alkyl, alkenyl, and aryl groups. Preferred substituted monovalent hydrocarbon groups are haloalkyl groups wherein some hydrogen atoms are replaced by halogen atoms such as chlorine; amino-substituted alkyl groups wherein some hydrogen atoms are replaced by amino groups or N-aminoalkylated amino groups; (meth)acryl- or (meth)-acryloxy-substituted alkyl groups; mercapto-substituted alkyl groups; and alkyl groups having an epoxy-containing substituent such as a glycidyl group. The group x plays the role of providing affinity to a resin component of a paint coating.

Letters a and b are integers, a is 1 to 3, preferably 3, b is 1 to 3, preferably 1, and the sum of a+b is equal to 4. When b is 2 or 3, the groups represented by X may be identical or different. The silane coupling agent should preferably have at least one alkenyl group (such as vinyl) or substituted monovalent hydrocarbon group.

Illustrative, non-limiting examples of the silane coupling agent include vinyltrichlorosilane, vinyltris(β-methoxyethoxy) silane, vinyltriethoxysilane, vinyltrimethoxysilane, γ-(methacryloyloxypropyl) trimethoxysilane, β-(3,4-epoxycyclohexyl) ethyltrimethoxysilane, γ-glycidyloxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. They may be used alone or in admixture of two or more.

When ionomer resins are used as the cover stock of golf balls as is often the case, N-β-(aminoethyl)-γ-aminopropyltrimethoxysilane and γ-chloropropyltrimethoxysilane are especially effective for improving adhesion. A mixture of these silanes may also be used. In particular, a mixture of 60 to 99% by weight, preferably 80 to 95% by weight of N-β-(aminoethyl)-γ-aminopropyltrimethoxysilane and 1 to 40% by weight, preferably 5 to 20% by weight of γ-chloropropyltrimethoxysilane is effective for improving adhesion and forms a stable surface treating agent.

Preferably the silane coupling agent is used as a solution in water or organic solvent. From the standpoint of manufacturing efficiency, it is advantageous to use the organic solvent having a higher rate of evaporation than water. Exemplary organic solvents are ethanol, methanol, and a mixture of ethanol or methanol with butyl cellosolve. A mixture of ethanol and a minor amount, typically 0.01 to 0.1 mol/liter of acetic acid is preferred. When the silane coupling agent is dissolved in water, it is preferred to add a minor amount, typically 0.001 to 0.1 mol/liter of HCl to water.

The amount of the silane coupling agent added to water or organic solvent is preferably at least 0.3% by weight, more preferably 0.5 to 2% by weight. A concentration of less than 0.3% by weight would fail to provide sufficient adhesion later. A concentration of more than 2% by weight would achieve no further improvement in adhesion and sometimes adversely affect the stability of the solution.

In addition to the silane coupling agent, adhesive resins such as epoxy compounds, vinyl chloride-vinyl acetate copolymers, and melamine resins may be added to the surface treating agent as a film-forming compound. In this embodiment, a coating layer is formed after the treatment. The amount of the film-forming compound added is less than 5% by weight, preferably 1 to 3% by weight. When the surface treating agent contains the film-forming compound, water can destroy the stability of the surface treating agent. It is then recommended to use an organic solvent as the solvent and avoid the use of water as the solvent.

The surface treatment technique is not critical. Any of conventional techniques including brushing, spray coating, and dipping may be used. The dipping technique featuring economy is preferred to the spray coating technique which wastes the surface treating agent. Dipping is usually done at a temperature of 5 to 35° C. for about 1 to 15 seconds. The thickness or coverage of the surface treating agent varies with a particular treating technique although it is usually less than 1 μm.

By subjecting the golf ball surface to physical pretreatment and then to the surface treatment according to the invention, the adhesion of the ball surface to the paint coating can be further improved. Such physical pretreatment may be buffing, shot blasting or liquid honing, with the honing treatment being preferred. The liquid honing treatment is by immersing a golf ball in water in a tank and operating the honing machine for 1 to 30 minutes, preferably 1 to 20 minutes whereby the ball surface is physically tailored. Less than 1 minutes of honing is not effective whereas more than 30 minutes of honing would collapse the dimple shape on the ball surface.

It is also possible to carry out discharge treatment such as corona discharge and plasma treatment prior to the surface treatment according to the invention although not recommended because such discharge treatment requires an installation cost and adds extra steps to the manufacturing process.

After the surface treatment according to the invention, the ball surface is coated with a commonly used paint composition by well-known techniques. The paint composition may be an enamel or clear lacquer composition comprising a urethane, epoxy, acryl or other resin base. Urethane coating compositions are preferred in that they form coatings having sufficient elongation and adhesion to withstand impact and deformation upon ball hitting with a club. Two-part curable urethane coating compositions are useful. To the coating compositions, opaque pigments such as titanium dioxide and fluorescent pigments or dyestuffs may be added to form the golf ball surface white or colored and opaque. If desired, UV absorbers, fluorescent brighteners or the like are added in conventional amounts.

The surface coating technique is not critical and may be selected from well-known ones, for example, brush coating, spray coating, electrostatic painting, and dipping. The surface paint coating is usually 5 to 40 μm, preferably 10 to 25 μm thick. Two or more paint coatings may be formed.

There has been described a method for surface treating a golf ball in a simple, but effective manner without a need for special equipment, to thereby tailor the ball surface into a state capable of joining a paint coating at a high bonding force therebetween. Thus the surface treating method of the invention ensures the manufacture of a golf ball having a paint coating which is improved in all of aesthetic appearance, impact durability, wear resistance, water resistance, and ink receptivity.

The golf ball which is treated by the method of the invention may have any desired structure and can be manufactured by well-known methods using conventional ball stocks. The invention is applicable to wound golf balls comprising a wound core enclosed with a cover and solid golf balls including one-piece balls and two-piece and multi-piece golf balls comprising a core enclosed with a cover. The invention is more advantageous when applied to two-piece solid golf balls comprising a core enclosed with a cover. In this regard, the cover stocks may be thermoplastic resins, typically ionomer resins which are commonly used in conventional golf balls.

The diameter, weight and other parameters of the golf ball are determined in accordance with the Rules of Golf.

EXAMPLE

Examples of the invention are given below by way of illustration and not by way of limitation.

Examples and Comparative Examples

A solid core having a weight, diameter and hardness as shown in Table 1 was prepared by milling a solid core composition of the formulation shown in Table 1 and molding and vulcanizing the composition at 150° C. for 15 minutes. The core was enclosed with a cover by injection molding a cover stock of the formulation shown in Table 1. There was obtained a two-piece solid golf ball having physical properties as shown in Table 1.

TABLE 1

| Solid core composition (pbw) | Cis-1,4-polybutadiene | 100 |
|---|---|---|
| | $ZnO_2$ | 5 |
| | $BaSO_4$ | 15 |
| | Zinc acrylate | 24 |
| | Dicumyl peroxide | 1 |
| Cover composition (pbw) | Thermoplastic resin (ionomer) | 94 |
| | $TiO_2$ | 4.82 |
| | Blue pigment | 0.03 |
| | Lubricant | 1.15 |
| Solid core | Diameter (mm) | 38.55 |
| | Weight (g) | 35.5 |
| | Hardness* (mm) | 3.5 |
| Cover | Gage (mm) | 2.0 |
| | Hardness (Shore D) | 63 |
| Final ball | Diameter (mm) | 42.55 |
| | Weight (g) | 45.30 |
| | Hardness* (mm) | 2.80 |

*a distortion (mm) under an applied load of 100 kg

The golf ball was subject to honing treatment for 10 minutes and then to surface treatment and surface coating as described in Examples 1 to 6 and Comparative Examples 1 to 3.

Example 1

The surface treating agent used was a 0.5 wt % ethanol solution of N-β-(aminoethyl)-γ-aminopropyltrimethoxysilane. The ball was immersed in the solution at 20° C. for 10 seconds for surface treatment, dried at room temperature, then spray coated with a two-part curable urethane coating composition to form a coating of 15 μm thick. A paint coated golf ball of Example 1 was obtained. The thickness of the paint coating was the same throughout the following Examples and Comparative Examples.

Example 2

A paint coated golf ball was obtained by the same procedure as in Example 1 except that the surface treating agent was changed to a 0.5 wt % ethanol solution of γ-chloropropyltrimethoxysilane.

Example 3

A paint coated golf ball was obtained by the same procedure as in Example 1 except that the surface treating agent was changed to a 3:1 mixture of a 0.5 wt % ethanol solution of N-β-(aminoethyl)-γ-aminopropyltrimethoxysilane and a 0.5 wt % ethanol solution of γ-chloropropyltrimethoxy-silane.

Example 4

A paint coated golf ball was obtained by the same procedure as in Example 1 except that 0.3% by weight of an epoxy resin (trade name: EPICRON 1050) was added to the surface treating agent of Example 1.

Example 5

A paint coated golf ball was obtained by the same procedure as in Example 1 except that 0.3% by weight of an epoxy resin (trade name: EPICRON 1050) was added to the surface treating agent of Example 2.

Example 6

A paint coated golf ball was obtained by the same procedure as in Example 1 except that 0.3% by weight of an epoxy resin (trade name: EPICRON 1050) was added to the surface treating agent of Example 3.

Comparative Example 1

A paint coated golf ball was obtained by applying an aqueous epoxy primer instead of the surface treating agent and then the two-part curable urethane coating composition.

Comparative Example 2

A paint coated golf ball was obtained by treating the ball surface with an argon plasma (frequency 13.56 MHz, power 80 W, 30 sec., initial pressure $1\times10^{-3}$ Torr, pressure during treatment or gas feed 0.1 Torr) instead of the surface treating agent and then applying the two-part curable urethane coating composition.

Comparative Example 3

A paint coated golf ball was obtained by subjecting the ball surface to corona treatment (in air, frequency 20 kHz, voltage 56 kV, 1 sec.) instead of the surface treating agent and then applying the two-part curable urethane coating composition.

Next, the coated golf balls of Examples 1 to 6 and Comparative Examples 1 to 3 were subject to an adhesion test, repetitive hitting test, abrasion test, water immersion test, and transfer mark test as described below. The results are shown in Table 2.

Adhesion Test

The ball coating surface was cross-cut (10 mm×10 mm). A cellophane tape (Cellotape®) was attached thereto and then quickly peeled in an instant. After the adhesive tape was peeled, the ball was visually observed to examine if the coating was stripped and rated "◯" for no stripping and "X" for some stripping.

Repetitive Hitting Test

Using a hitting machine by True Temper Co., the ball was repetitively hit 200 times with a driver at a head speed of 45 m/sec. After the test, the ball was visually observed to examine if the coating was stripped and rated "◯" for no stripping, "Δ" for partial stripping, and "X" for considerable stripping.

Abrasion Test

The ball was polished by placing it in a pot mill together with abrasives (NUGGET MORUNDUM SN (size 5S) by Showa Denko K. K.) and operating the mill at 30 rpm for 2 hours. After the test, the ball was visually observed to examine if the coating was stripped and rated "◯" for no stripping, "Δ" for partial stripping, and "X" for considerable stripping.

Water Immersion Test

The ball was immersed in water at 15° C. for 48 hours. After the test, the ball was visually observed to examine the coating state and rated "◯" for no change and "X" when the coating was blistered even slightly.

Transfer Mark Test

Using a transfer print tape bearing two types of ink, urethane and vinyl chloride-vinyl acetate copolymer based ink compositions, marks were heat transfer printed on the ball coating surface at 155° C. for 0.8 second. By a visual observation, a degree of transfer was rated "◯" when both types of ink were well transferred, "Δ" when only one type of ink was well transferred, and "X" when both were poorly transferred.

TABLE 2

|  | E1 | E2 | E3 | E4 | E5 | E6 | CE1 | CE2 | CE3 |
|---|---|---|---|---|---|---|---|---|---|
| Adhesion test | ○ | ○ | ○ | ○ | ○ | ○ | ○ | ○ | Δ |
| Repetitive hitting test | ○ | ○ | ○ | ○ | ○ | ○ | ○ | ○ | X |
| Abrasion test | ○ | ○ | ○ | ○ | ○ | ○ | ○ | ○ | Δ |
| Water immersion test | ○ | ○ | ○ | ○ | ○ | ○ | Δ | ○ | X |
| Transfer mark test | ○ | ○ | ○ | ○ | ○ | ○ | Δ | Δ | X |

As seen from Table 2, the surface treatment according to the invention helps the ball surface bear a paint coating which is improved in all of adhesion, impact durability, friction resistance, water resistance, and ink receptivity.

The surface treating method of the invention is capable of surface treating a golf ball in a simple, but effective manner without a need for special equipment. The method thus ensures the manufacture of a golf ball having a paint coating which is improved in all of adhesion, durable impact resistance, friction resistance, water resistance, and ink receptivity.

Japanese Patent Application No. 339050/1996 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for surface treating a golf ball comprising an ionomer resin cover, prior to painting, comprising: treating the surface of said ionomer resin cover with a surface treating agent comprising a silane coupling agent consisting essentially of a mixture of 60 to 99% by weight of N-β-(aminoethyl)-γ-aminopropyltrimethoxysilane and 1 to 40% by weight of γ-chloropropyltrimethoxysilane.

2. The surface treating method of claim 1 wherein the surface treating agent further comprises an epoxy compound.

3. The surface treating method of claim 1 wherein the surface treating agent comprises a solution of silane coupling agent in water or organic solvent and the amount of the silane coupling agent is 0.3 to 2% by weight.

4. The surface treating method of claim 3 wherein the surface treating agent further comprises an epoxy compound, a vinyl chloride-vinyl acetate or a melamine resin in an amount of 1 to 5% by weight.

5. The surface treating method of claim 3 wherein the golf ball is immersed in the silane coupling agent solution at a temperature of 5 to 35° C. for about 1 to 15 seconds.

6. The surface treating method of claim 1 further comprising painting the surface treated golf ball with an enamel or a clear lacquer composition comprising a urethane, epoxy or acryl resin base.

7. The surface treating method of claim 3 further comprising painting the surface treated golf ball with an enamel or a clear lacquer composition comprising a urethane, epoxy or acryl resin base.

* * * * *